United States Patent [19]

Wong et al.

[11] 3,755,629

[45] Aug. 28, 1973

[54] ELECTRONIC MATRIX SCANNER FOR A TELEPHONE CENTRAL OFFICE

[75] Inventors: Cho Lun Wong, Ottawa, Ontario; Glenson Trevelyn Jones, Kanata, Ontario; Helmuth Krausbar, Ottawa, Ontario, all of Canada

[73] Assignee: Northern Electric Company Limited, Montreal, Quebec, Canada

[22] Filed: Jan. 14, 1972

[21] Appl. No.: 217,924

[52] U.S. Cl. .......................... 179/18 ES, 179/18 FG

[51] Int. Cl. .......................................... H04m 3/22

[58] Field of Search .................... 179/18 FF, 18 FG, 179/18 ES, 18 AB, 18 E

[56] References Cited

UNITED STATES PATENTS

| | | | |
|---|---|---|---|
| 3,493,683 | 2/1970 | Schlichte et al. | 179/18 FG |
| 3,159,715 | 12/1964 | Abbott, Jr. et al. | 179/18 FC |
| 3,558,828 | 1/1971 | Marty et al. | 179/18 FG |
| 3,566,377 | 2/1971 | Lucas et al. | 179/18 FG X |
| 3,560,655 | 2/1971 | Lucas et al. | 179/18 FF |

*Primary Examiner*—Thomas W. Brown
*Attorney*—Alfred A. De Luca

[57] ABSTRACT

An electronic scanner for use in a telephone central office wherein the scanner sensors are arranged in a plurality of scanner rows to form a scanner sensor matrix. A scanner row change indicator associated with each scanner row detects and registers a change if any of the scanner sensors which form its associated scanner row experience a change of state. By scanning only the scanner rows which have indicated a change, via corresponding row change indicators, valuable central processor time may be saved.

7 Claims, 2 Drawing Figures

ELECTRONIC MATRIX SCANNER FOR A TELEPHONE CENTRAL OFFICE

FIELD OF THE INVENTION

This invention relates to telephone central office equipment and more particularly to an electronic scanner for an electronic telephone central office.

DESCRIPTION OF THE PRIOR ART

In an electronic telephone office the scanner serves as a supervisory link between the central processor and various scan points distributed throughout the central office. The state of a typical scan point as seen by the scanner may, for example, indicate to the central processor that a particular relay in a line, trunk, originating junctor or service circuit of the central office equipment has operated or released, or that a particular condition exists at one of the diagnostic scan points in the central office peripheral circuitry. In view of the continuously changing conditions in a telephone office it is imperative that each scan point be monitored as often as possible.

A scanner for a typical electronic telephone office is described in the Bell System Technical Journal, Vol. XLIII, September 1964, No. 5, part 2 at pages 2259 et seq. This aforementioned publication describes the No. 1 Electronic Switching System (No. 1 ESS). Another publication which illustrates the use of a scanner in an Electronic Switching System is the Technical Journal TELESIS, Volume 1, No. 4 published by the Northern Electric Company Limited at page 122 and pages 134 et seq. This latter publication describes the Stored Program Electronic Switching System (SP-1 ESS).

A scanner in a typical central office receives information in the form of a data word from the central processor via a peripheral address bus. This information is used to select and interrogate a group of scan points generally arranged and referred to as a scanner row. Under control of the central processor the state of all the scan points which comprise the selected scanner row is sent back to the central processor via a scan return bus. The information received from the selected scanner row is compared by the central processor with a previously stored record of the states of all the scan points of said selected scanner row and any changes are noted. In the SP-1 Electronic Switching System there are 64 scanner rows of 16 scanner sensors with each scanner sensor assigned to a particular scan point. During call processing the central processor sends a total of 64 word instructions to the scanner, one word instruction to supervise the scan points corresponding to each of the 64 scanner rows. As each word instruction busies the central processor for a certain interval of time, a significant time interval is required to scan all the scan points in the central office. Under normal traffic conditions only a certain number of scan points undergo a change of state during the interval between successive scanning operations. As the scan points associated with certain scanner rows will not have undergone any changes during this interval, a significant amount of central processor time is wasted in scanning these scanner rows.

SUMMARY OF THE INVENTION

It has been found that the total amount of central processor time normally alloted for scanning can be reduced by interrogating or scanning only those scanner rows which have undergone a change. To reduce the scanning interval a scanner row change indicator is assigned to each scanner row to provide an indication if any one of the scan points of its assigned scanner row has changed in state. With this arrangement the central processor first checks a group of scanner row change indicators to find out which scanner rows have experienced a change at at least one of their corresponding scan points. After determining which scanner rows have undergone at least one change, the central processor issues a series of commands to interrogate only those scanner rows which have indicated a change, in order to determine the new states of the scan points which have changed.

Thus in accordance with the present invention the improved electronic scanner, for use in an electronic central office having a central processor and a plurality of scan points, comprises a plurality of scanner sensors for monitoring the states of the scan points in the central office. This plurality of scanner sensors is grouped into a plurality of scanner rows with each scanner sensor of each scanner row being assigned to a particular scan point.

This improved electronic scanner also comprises a plurality of scanner row change indicators, one scanner row change indicator corresponding solely to each scanner row. Each scanner row change indicator serves to indicate a change of state at any of the scan points corresponding to the scanner sensors grouped in its corresponding scanner row. A means responsive to a first command from the central processor, permits monitoring of the scanner row change indicators by the central processors so as to determine whether one or more scan points of each particular scanner row corresponding to each scanner row change indicators, have change in state. A means, responsive to a second command from the central processor, is also provided for monitoring the state of each scan point associated with a particular scanner row so as to determine which scan points have undergone a change in state in each particular scanner row.

BRIEF DESCRIPTION OF THE DRAWINGS

An example embodiment of the invention will now be described with reference to FIGS. 1A and 1B. These figures illustrate a block diagram schematic of a scanner in accordance with the present invention.

DESCRIPTION OF THE PREFERRED EMBODIMENT

In the following description, numerals less than 1,000 are used to designate the general structural arrangement of the scanner. Numerals equal to or greater than one thousand are used to refer to specific functional blocks and locations in the detailed operation of a representative portion of the scanner circuitry.

Figure 1A:
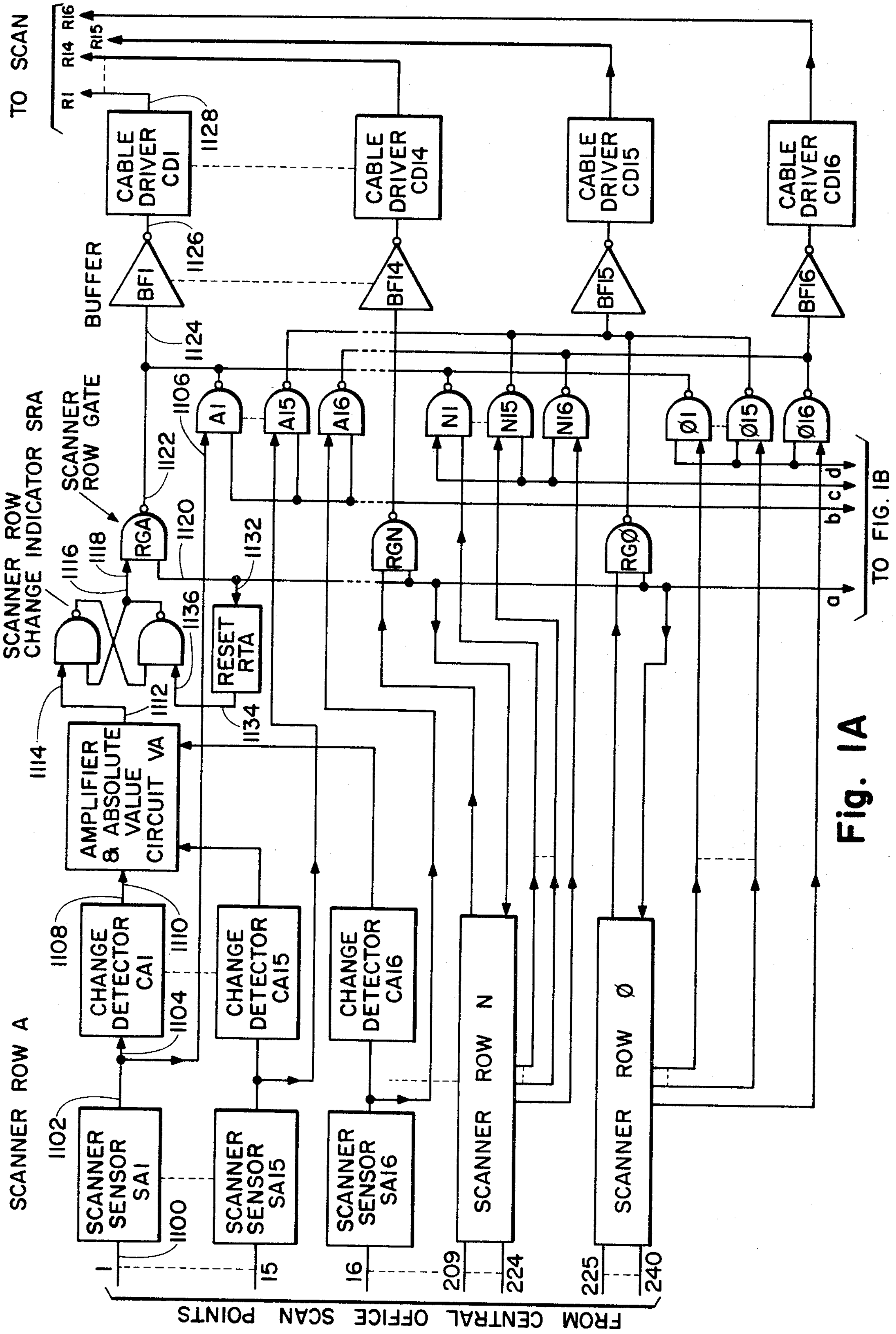
Figure 1B:
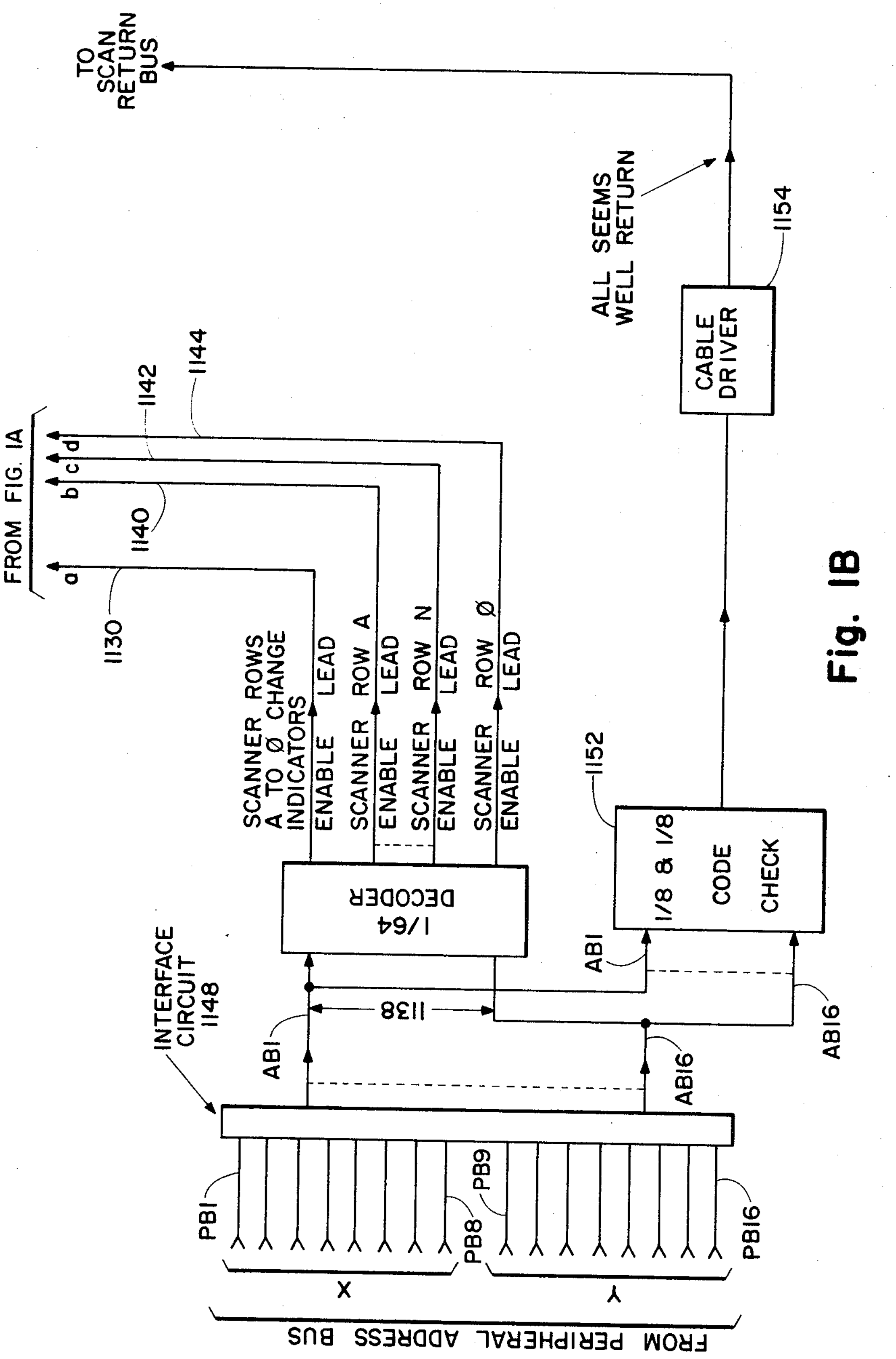

Referring to the FIGS. 1A and 1B it can be seen that the preferred embodiment comprises a group of 15 scanner rows of which only scanner row A is shown. Each scanner row has 16 scanner sensors which are connected to various scan points distributed throughout the telephone central office (the scan points are not shown). Only scanner sensors SA1, SA15 and SA16 of scanner row A are shown for simplicity. The functional blocks which denote scanner sensors SA1 and SA15 are joined by hyphens to denote the omission of the functional blocks corresponding to scanner sensors SA2 to SA14 inclusive. The scanner embodiment shown in FIGS. 1A and 1B has provision for a total of 15 × 16 or 240 scan points as there are a total of 240 scanner sensors. If desired the handling capacity of the scanner may be readily increased by adding additional groups of 15 scanner rows. Each scanner sensor is assigned and wired to an assigned scan point so as to continuously monitor the status of said assigned scan point. The output of each scanner sensor is connected to a corresponding change detector. Only change detectors CA1, CA15 and CA16 of scanner row A is shown for simplification. As was done with the scanner sensors, the functional blocks which denote change detectors CA1 and CA15 are joined by hyphens to denote the omission of the functional blocks corresponding to change detectors CA2 to CA14 inclusive.

In the preferred embodiment the output of each scanner sensor is a DC voltage level which may represent either a "high" or "low" depending on the state of the corresponding scan point. Each change detector, generates a pulse in response to a shift in the output DC voltage level of its corresponding scanner sensor. All 16 change detectors associated with each scanner row are connected to share an amplifier and absolute value circuit corresponding to said scanner row. The output of each amplifier and absolute value circuit is connected in turn to a corresponding flip-flop or scanner row change indicator. There are 15 amplifier and absolute value circuits and fifteen flip-flops, as one amplifier and absolute value circuit and one flip-flop corresponding to each scanner row. The amplifier and absolute value circuit functional blocks, and the flip-flops are respectively designated as VA to VO inclusive, and SRA to SRO inclusive, to show their correspondence with scanner rows A to O inclusive. The outputs of each of the 15 flip-flops are respectively connected to 15 corresponding dual input NAND (scanner row) gates. Alternately, if desired, dual input AND gates can be used in lieu of the NAND gates if appropriate logic changes are made. By way of example the output 1116 of flip-flop SRA is connected to one input 1118 of dual input NAND or scanner row gate RGA. The other input of each of the 15 scanner row gates is connected together to an enable circuit as will be described later. Fifteen reset circuits, of which only reset circuit RTA is shown, are connected via their inputs to the previously mentioned enable circuit. The outputs of each reset circuit are respectively connected to the reset inputs of the 15 flip-flops such that all 15 flip-flops can be simultaneously reset by a reset signal from the enable circuit. The outputs of each of the 15 scanner row gates are respectively connected to 15 of the 16 buffers, which in turn are connected to their respective cable drivers. The buffers and the cable drivers are designated as BF1 to BF16 and CD1 to CD16 respectively as shown in FIG. 1A. Only buffers BF1, BF14, BF15 and BF16 and cable drivers CD1, CD14, CD15 and CD16 are shown. A series of hyphens joining buffer BF1 to buffer BF14 and cable driver CD1 to cable driver CD 14 denotes the functional blocks which have been omitted for simplicity. The outputs of each of the 16 cable drivers are connected to a scan return bus via 16 respective lead pairs R1 to R16 inclusive. This scan return bus serves as the means by which the scanner reports to the central processor as to the state of various scan points (the central processor is not shown).

Instruction from the central processor are sent to the scanner on a 16 bit peripheral address bus which is divided into two groups of 8 bits. As shown in FIG. 1B, one group of 8 bits is labelled X and the other group is labelled Y. An interface circuit 1148 is provided, on each scanner, to receive data from the peripheral address bus, and to convert this data into instructions with suitable voltage levels. The interface circuit 1148 serves also to improve the data waveforms as required.

A decoder circuit 1150, labelled as a 1/64 decoder, in FIG. 1B, is used to generate various scanner operating signals from instructions received from the central processor data. The 16 output leads from the scanner interface circuit 1148 appear at the input of the 1/64 decoder 1150 and appropriate enable signals appear at the output of the 1/64 decoder. One output 1130 of the 1/64 decoder supplies the previously mentioned enable signal which appears as an input to the reset circuits (RTA to RTO inclusive) and which also appears as an input to each of the 15 dual input NAND or scanner row gates (RGA to RGO inclusive).

In addition to the previously mentioned 15 dual input NAND or scanner row gates (RGA to RGO inclusive) which receive signals from each of the 15 flip-flops (SRA to SRO inclusive), there are 15 groups of 16 dual input NAND or scanner sensor gates (A1 to A16 inclusive to O1 to O16 inclusive). Each of these 15 groups corresponds to a particular one of the 16 scanner rows. As each scanner row has 16 scanner sensors there are 16 dual input NAND or scanner sensor gates per group.

Only the first, fourteenth and fifteenth group of these dual input NAND or scanner sensor gates are shown. One input of each of the 16 scanner sensor gates of each group is connected to a particular enable output of 1/64 decoder. As there are 15 groups of 16 gates, a total of 16 decoder enable outputs are used to selectively enable the desired group of 16 scanner sensor gates. Only the first, 14th and 15th enable leads are shown in the FIG. 1B - 1140, 1142, 1144. The enable leads of the 2nd to 13th group of scanner sensor gates are indicated by hyphens joining the first to 14th enable leads. The other input of each of the aforementioned scanner sensor gates is connected to the output of one of the scanner sensors.

With refrence to scanner row A, by way of example, the output 1102 of scanner sensor SA1 is connected to the input 1106 of scanner sensor gate A1 of the group of 16 scanner sensor gates corresponding to scanner row A. In like manner the output of the scanner sensors SA2 to SA16 inclusive of scanner row A are respectively connected to scanner sensor gates A2 to A16 inclusive of the first group of 16 scanner sensor gates (A1 to A16 inclusive).

To serve as a partial check on the operation of the scanner, a code check circuit 1152 is incorporated in the scanner as shown in FIG. 1B by a functional block labelled 1/8 and 1/8 code check. This code check circuit 1152 ensures that only one data bit is received from each of the X and Y portions of the interface. If the proper form of input instruction is received by the scanner from the peripheral bus a corresponding cable driver 1154 sends a favourable report back to the central processor via an all-seems-well lead 1146.

OPERATION OF THE PREFERRED EMBODIMENT

As the operation of the scanner circuitry associated with scanner rows A to O inclusive is similar, the operation of the scanner will be described with reference to scanner row A only for simplicity. Furthermore, within scanner row A the description of the operation will be limited to the operation of the scanner related to scanner sensor SA1.

Assume that input 1100 of scanner sensor SA1 is connected to a scan point of the telephone central office which has just undergone a change of state. Assume also that this change of state results in a flow of current into the input 1100 of scanner sensor SA1. Alternately, one could assume that the aforementioned change of state has interrupted the flow of current into the input 1100 of scanner sensor SA1.

The flow of current into input 1100 of scanner sensor SA1 appears at the output 1102 of scanner sensor SA1 as a signal voltage of a magnitude and polarity which, logically corresponds to a "low" in the preferred embodiment. As long as the state of the scan point assigned to scanner sensor SA1 remains in this new state e.g., (current flowing into scanner sensor SA1) the output 1102 of scanner sensor SA1 remains in its logical "low" state.

The signal voltage at the output 1102 of scanner sensor SA1 appears at the input 1104 of change detector CA1 and also at input 1106 of scanner sensor gate A1 of the group of 16 scanner sensor gates corresponding to scanner row A.

When the output 1102 of scanner sensor SA1 dropped from a logical "high" to a logical "low" condition (in accordance with our assumption that current has just begun to flow into input 1100 of scanner sensor SA1) a pulse appeared at the output 1108 of change detector CA1.

Each change detector generates a pulse in response to a change in input signal level. Because the input signal level may change from a "high" to a "low" or vice versa, the output pulse may have either positive or negative polarity. The pulse appearing at the output 1108 of change detector CA1 appears at the input 1110 of amplifier and absolute value circuit VA where said pulse is amplified.

Regardless of the polarity appearing at input 1110 of amplifier and absolute value circuit VA, the polarity of the pulse appearing at the output 1112 of said circuit is always positive. This positive pulse, which is generated by the absolute value portion of the internal circuitry of amplifier and absolute value circuit VA, appears at input 1114 of flip-flop or scanner row change indicator SRA. The appearance of said positive pulse of input 1114 of flip-flop SRA "sets" flip-flop SRA. From FIG. 1A it can be seen that amplifier and absolute value circuit VA and aforementioned flip-flop SRA are shared by scanner sensors SA1 to SA 16 inclusive of scanner row A. Thus, a change at any of the 16 scan points corresponding to scanner row A will set flip-flop SRA.

The output 1116 of flip-flop SRA appears at input 1118 of a dual input NAND or scanner row gate RGA. If an enable signal is present at the other input 1120 of said scanner row gate RGA, a corresponding output appears at the output 1122 of said scanner row gate. This enable signal also appears at input 1132 of reset circuit RTA. The output 1134 of reset circuit RTA is connected to the reset input 1136 of flip-flop SRA in order to reset flip-flop SRA after the content of flip-flop SRA has reached the central processor. The signal appearing at the output 1122 of said scanner row gate SRA appears at the input 1124 of buffer BF1 and then at the input 1126 of cable driver CD1. As the output 1128 of cable driver CD1 is connected to lead R1 of the scan return bus, it can be seen that the information stored in flip-flop SRA can be sent to the central processor by supplying an enable signal to input 1120 of scanner row gate A. As flip-flop SRA is "set" by the first occurrence of a change of state among the 16 scan points assigned to scanner row A the central processor is readily informed of any scan points in scanner row A which have undergone a change of state by monitoring said flip-flop SRA. The circuitry associated with scanner rows B to O inclusive operates in a manner similar to the operation as described for scanner row A. Cable drivers CD1 to CD15 inclusive, respectively and simultaneously, report the states of flip-flops SRA to SRO inclusive to the central processor via the scan return bus when an enable signal is applied to all 15 scanner row gates RGA to RGO inclusive via output lead 1130 of the 1/64 decoder. Once the outputs of all 15 flip-flops, RGA to RGO, have reached the central processor via the scan return bus, the scanner rows which have undergone a change are readily determined.

After the central processor has determined which scanner rows have undergone a change, a series of instructions are sent to the scanner from the central processor via the peripheral bus. Each of these instructions sequentially appear at the inputs 1138 of the 1/64 decoder 1150 and each instruction relates to one of the particular scanner rows which has reported a change to the central processor.

After any one of these instructions has been decoded by the 1/64 decoder an enable signal appears on the output lead of the decoder which is connected to the 16 dual input NAND or scanner sensor gates corresponding to the one of the scanner rows which has reported a change. If, for example, scanner row A had reported a change an enable signal will be sent from the decoder via scanner row A, enable lead 1140 the scanner sensor gates corresponding to scanner row A. These 16 gates (A1 to A16 inclusive) will pass the signals appearing on the outputs of scanner sensors SA1 to SA16 inclusive of scanner row A to the central processor via buffers BF1 to BF16 inclusive and cable drivers CD1 to CD16 inclusive. From cable drivers CD1 to CD16 inclusive said signals reach the scan return bus via leads R1 to R16 inclusive. In like manner the groups of 16 scanner sensor gates corresponding to the other scanner rows which have indicated a change are sequentially enabled until all the scan points of only those scanner rows which have indicated a change have been monitored by the central processor.

What is claimed is:

1. An electronic scanner for a telephone central office having a central processor and a plurality of scan points, said scanner comprising:

a plurality of scanner sensors for monitoring the state of said scan points, each scanner sensor corresponding solely to a particular scan point, said plurality of scanner sensors being grouped in a plurality of scanner rows;

a plurality of scanner row change indicators, each of said indicators corresponding solely to a particular scanner row, and connected to continually and simultaneously monitor each of the scanner sensors of said particular scanner row so as to indicate and register a change attributable, either individually or collectively, to a change of state occurring at any of the scan points corresponding to the scanner sensors grouped in said particular scanner row;

means, responsive to a first command from the central processor, for simultaneously monitoring a plurality of scanner row change indicators by the central processor to determine for each particular scanner row, by indication of a change at a corresponding scanner row change indicator whether a scan point of said particular scanner row has undergone a change of state;

means, responsive to a second command from the central processor, for monitoring the state of each scan point associated with a particular scanner row by the central processor so as to determine which scan point of said particular scanner row has undergone a change of state as indicated by a change at the scanner row change indicator associated with said particular scanner row;

whereby a change of state in any of the scan points in the telephone central office is communicated to the central processor by monitoring all the scanner sensors of only the scanner rows whose corresponding scanner row change indicators have indicated a change.

2. The invention as claimed in claim 1 wherein each scanner row change indicator comprises:

means for generating a signal in response to a change of state at any of the scan points of said scanner row;

means responsive to said signal, for storing an indication that the state of at least one of the scan points corresponding to said scanner row, has changed.

3. The invention as claimed in claim 2 wherein each scanner sensor monitors the state at a scan point by sensing the flow of direct current at said scan point.

4. The invention as claimed in claim 1 wherein the means for monitoring the scanner row change indicators by the central processor comprises:

a plurality of AND gates, each AND gate connected solely to a corresponding scanner row change indicator;

means, responsive to said first command from the central processor for enabling said AND gates;

means for transmitting a signal from each AND gate to the central processor;

whereby, in response to said first command, a change of state at a scan point associated with a scanner row, as indicated by a change at a corresponding scanner row change indicator, is transferred to said processor via the AND gate corresponding to said indicator.

5. The invention as claimed in claim 2 wherein the means for monitoring the scanner row change indicators by the central processor comprises:

a plurality of AND gates, each AND gate connected solely to a corresponding scanner row change indicator;

means, responsive to said first command from the central processor for enabling said AND gates;

means for transmitting a signal from each AND gate to the central processor;

whereby, in response to said first command, a change of state at a scan point associated with a scanner row, as indicated by a change at a corresponding scanner row change indicator, is transferred to said processor via the AND gate corresponding to said indicator.

6. The invention as defined in claim 1 wherein the means for monitoring the state of each scan point of a particular scanner row comprises:

a plurality of AND gates, each AND gate connected solely to a corresponding scanner sensor of said particular scanner row;

means, responsive to said second command from the central processor, for enabling said AND gates;

whereby, the state of all the scanner sensors associated with said particular scanner row is transferred to the central processor via said AND gates.

7. The invention as defined in claim 2 wherein the means for monitoring the state of each scan point of a particular scanner row comprises:

a plurality of AND gates, each AND gate connected solely to a corresponding scanner sensor of said particular scanner row;

means, responsive to said second command from the central processor, for enabling said AND gates;

whereby, the state of all the scanner sensors associated with said particular scanner row is transferred to the central processor via said AND gates.

* * * * *